United States Patent
Umeda et al.

(10) Patent No.: US 11,343,132 B2
(45) Date of Patent: May 24, 2022

(54) RADIO TRANSMISSION DEVICE, RADIO RECEPTION DEVICE, RADIO COMMUNICATION DEVICE, RADIO COMMUNICATION SYSTEM, RADIO TRANSMISSION METHOD, CONTROL CIRCUIT, AND RECORDING MEDIUM

(71) Applicant: Mitsubishi Electric Corporation, Tokyo (JP)

(72) Inventors: Shusaku Umeda, Tokyo (JP); Shinji Masuda, Tokyo (JP); Kazumasa Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/108,380

(22) Filed: Dec. 1, 2020

(65) Prior Publication Data
US 2021/0083920 A1    Mar. 18, 2021

Related U.S. Application Data (63) Continuation of application No. PCT/JP2018/022103, filed on Jun. 8, 2018.

(51) Int. Cl.
*H04L 5/12* (2006.01)
*H04L 27/26* (2006.01)
(Continued)

(52) U.S. Cl.
CPC ....... *H04L 27/2666* (2013.01); *H04B 1/1027* (2013.01); *H04B 7/0615* (2013.01); *H04B 2001/1072* (2013.01)

(58) Field of Classification Search
CPC ............. H04L 27/2666; H04L 27/2655; H04L 27/2675; H04L 27/2691; H04L 27/2626;
(Continued)

(56) References Cited

U.S. PATENT DOCUMENTS 5,771,224 A * 6/1998 Seki .................. H04L 27/18
370/206
2002/0122381 A1 9/2002 Wu et al.
(Continued)

FOREIGN PATENT DOCUMENTS

JP       2010-4280 A     1/2010
JP     2011-515914 A     5/2011
(Continued)

OTHER PUBLICATIONS

International Search Report (PCT/ISA/210) issued in PCT/EP2018/022103 dated Aug. 21, 2018.
(Continued)

*Primary Examiner* — Helene E Tayong
(74) *Attorney, Agent, or Firm* — Birch, Stewart, Kolasch & Birch, LLP (57) ABSTRACT

A radio transmission device includes: a known signal generating unit that generates a first known signal and a second known signal mapped in such a manner that subcarriers for transmitting a first signal not being 0 do not overlap with each other in symbols of one time band; an IDFT unit that converts the first known signal and the second known signal from a frequency domain signal into a time domain signal; a GI inserting unit that inserts a guard interval into the first known signal and the second known signal converted into time domain signals; a transmission antenna that transmits the first known signal in which the guard interval is inserted; and a transmission antenna that transmits the second known signal in which the guard interval is inserted.

3 Claims, 10 Drawing Sheets

(51) Int. Cl.
   *H04B 1/10* (2006.01)
   *H04B 7/06* (2006.01)
(58) Field of Classification Search
   CPC ............. H04L 27/2602; H04L 27/2613; H04L 5/0073; H04L 5/0023; H04L 5/0048; H04L 1/06; H04B 1/1027; H04B 7/0615; H04B 2001/1072; H04B 7/06; H04J 11/005
   USPC ........................................................ 375/262
   See application file for complete search history.

(56) References Cited

U.S. PATENT DOCUMENTS

| | | | |
|---|---|---|---|
| 2004/0171352 A1 | 9/2004 | Maeda et al. | |
| 2005/0207351 A1* | 9/2005 | Inagawa | H04B 1/715 370/252 |
| 2010/0048151 A1* | 2/2010 | Hara | H04J 11/0056 455/115.1 |
| 2011/0009137 A1 | 1/2011 | Chung et al. | |
| 2011/0013585 A1* | 1/2011 | Jitsukawa | H04L 5/0048 370/330 |
| 2011/0243268 A1* | 10/2011 | Mashino | H04L 1/0026 375/285 |
| 2011/0317682 A1* | 12/2011 | Matsumura | H04L 27/2607 370/343 |
| 2012/0014477 A1 | 1/2012 | Ko et al. | |
| 2012/0044893 A1* | 2/2012 | Suzuki | H04W 72/085 370/329 |
| 2013/0208619 A1* | 8/2013 | Kudo | H04L 5/0023 370/252 |
| 2016/0241351 A1 | 8/2016 | Suzuki et al. | |

FOREIGN PATENT DOCUMENTS

| | | |
|---|---|---|
| JP | 4756090 B2 | 8/2011 |
| JP | 2011-199480 A | 10/2011 |
| JP | 2012-521709 A | 9/2012 |
| WO | WO 2009/110756 A | 9/2009 |
| WO | WO 2015/045585 A1 | 4/2015 |

OTHER PUBLICATIONS

Japanese Office Action for application No. 2018-557061 dated Nov. 27, 2018.
Extended European Search Report for European Application No. 18921745.8, dated Apr. 14, 2021.
Office Action dated Dec. 10, 2021 in corresponding Indian Patent Application No. 202047050787.
Communication pursuant to Article 94(3) EPC dated Jan. 13, 2022 in corresponding European Application No. 18 921 745.8.

* cited by examiner

FIG.13

RADIO TRANSMISSION DEVICE, RADIO RECEPTION DEVICE, RADIO COMMUNICATION DEVICE, RADIO COMMUNICATION SYSTEM, RADIO TRANSMISSION METHOD, CONTROL CIRCUIT, AND RECORDING MEDIUM

CROSS-REFERENCE TO RELATED APPLICATION

This application is a continuation application of International Application PCT/JP2018/022103, filed on Jun. 8, 2018, and designating the U.S., the entire contents of which are incorporated herein by reference.

BACKGROUND OF THE INVENTION

1. Field of the Invention

The disclosure relates to a radio transmission device, a radio reception device, a radio communication device, a radio communication system, a radio transmission method, a control circuit, and a recording medium, for performing radio communication.

2. Description of the Related Art

In an environment in which a plurality of radio devices perform radio communication in one frequency band, a radio device may receive signals transmitted from other radio devices other than a desired radio device at the same time in addition to desired signals transmitted from the desired radio device. For the radio device, the radio devices other than the desired radio device are interference sources and signals transmitted from the radio devices other than the desired radio device are interference signals. Japanese Patent No. 4756090 teaches a technology for, when a reception radio station has received, in addition to desired signals from a desired transmission radio station in the same radio system, interference signals from other transmission radio stations in the same radio system, detecting interference components of the interference signals, and removing the influence of the interference signals.

The reception radio station described in Japanese Patent No. 4756090, however, can only remove the influence of interference signals from transmission radio stations in the same radio system. Thus, the reception radio station described in Japanese Patent No. 4756090 has a problem in that the influence of interference signals from radio devices in unrelated radio systems cannot be removed. In addition, the reception radio station described in Japanese Patent No. 4756090 has a problem in that interference signals that only affects specific frequency, such as continuous waves (CWs), interference signals that occur for a short time at a timing of estimating frequency deviation and temporal synchronization timing, and the like may be received, and the influence of such interference signals cannot be removed, either.

SUMMARY OF THE INVENTION

To solve the aforementioned problems and achieve the object, a radio transmission device according to an aspect of the disclosure includes a known signal generating unit to generate a first known signal and a second known signal mapped in such a manner that subcarriers for transmitting a first signal not being 0 do not overlap with each other in symbols of one time band. The radio transmission device also includes an inverse discrete Fourier transform unit to convert each of the first known signal and the second known signal from a frequency domain signal into a time domain signal. The radio transmission device also includes a guard interval inserting unit to insert a guard interval into each of the first known signal and the second known signal converted into time domain signals. The radio transmission device also includes a first transmission antenna to transmit the first known signal in which the guard interval is inserted; and a second transmission antenna to transmit the second known signal in which the guard interval is inserted.

DETAILED DESCRIPTION OF THE PREFERRED EMBODIMENTS

A radio transmission device, a radio reception device, a radio communication device, a radio communication system, a radio transmission method, a control circuit, and a recording medium according to certain embodiments will be described in detail below with reference to the drawings.

First Embodiment

Figure 1:
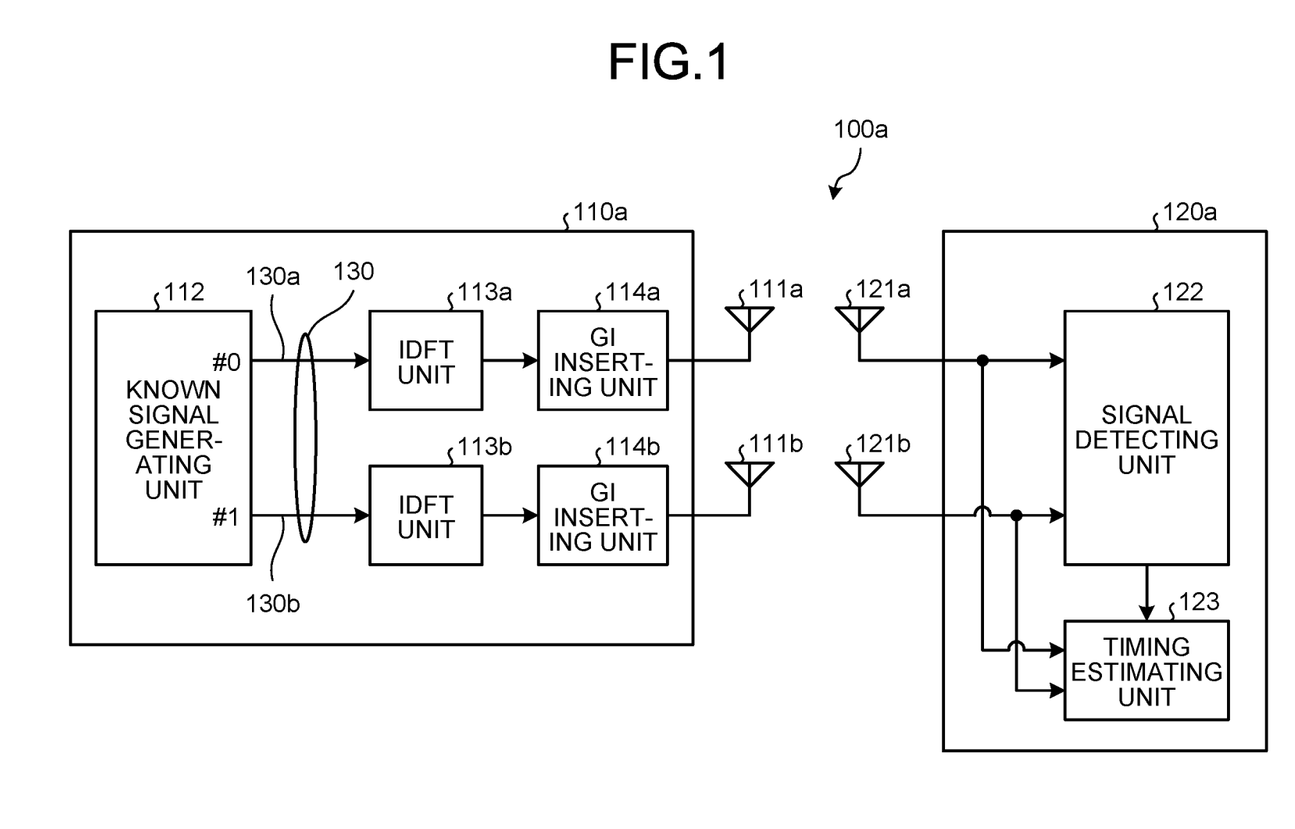
FIG. 1 is a diagram illustrating an example of a configuration of a radio communication system according to a first embodiment.

FIG. 1 is a diagram illustrating an example of a configuration of a radio communication system 100a according to a first embodiment. The radio communication system 100a includes a radio transmission device 110a and a radio reception device 120a. The radio communication system 100a is assumed to be in an environment in which the radio communication system 100a has a frequency band in common with other radio communication systems, which are not illustrated. In the radio communication system 100a, the radio reception device 120a may also receive interference signals such as signals transmitted from radio devices included in other radio communication systems, CWs, and short-time interference, in addition to desired signals transmitted from the radio transmission device 110a.

A configuration of the radio transmission device 110a will be described. The radio transmission device 110a includes transmission antennas 111a and 111b, a known signal generating unit 112, inverse discrete Fourier transform (IDFT) units 113a and 113b, and guard interval (GI) inserting units 114a and 114b.

The known signal generating unit 112 generates a first known signal 130a and a second known signal 130b in the frequency domain modulated using the orthogonal frequency division multiplexing (OFDM) scheme. Details of the first known signal 130a and the second known signal 130b will be described later. The first known signal 130a and the second known signal 130b may be collectively referred to as known signals 130.

The IDFT unit 113a is an inverse discrete Fourier transform unit that converts the first known signal 130a from a frequency domain signal into a time domain signal by performing inverse discrete Fourier transform on the first known signal 130a generated by the known signal generating unit 112. The IDFT unit 113b is an inverse discrete Fourier transform unit that converts the second known signal 130b from a frequency domain signal into a time domain signal by performing inverse discrete Fourier transform on the second known signal 130b generated by the known signal generating unit 112. The radio transmission device 110a includes one IDFT unit for each of the first known signal 130a and the second known signal 130b in FIG. 1; this is, however, an example, and the radio transmission device 110a is not limited thereto. The radio transmission device 110a may include an IDFT unit that is one inverse discrete Fourier transform unit, and this IDFT unit may perform inverse discrete Fourier transform on the first known signal 130a and the second known signal 130b.

The GI inserting unit 114a is a guard interval inserting unit that inserts a guard interval (GI) between symbols of the first known signal 130a converted from a frequency domain signal into a time domain signal by the IDFT unit 113a. The GI inserting unit 114b is a guard interval inserting unit that inserts a guard interval between symbols of the second known signal 130b converted from a frequency domain signal into a time domain signal by the IDFT unit 113b. The symbols of the first known signal 130a and the second known signal 130b are OFDM symbols generated by the known signal generating unit 112. The radio transmission device 110a includes one GI inserting unit for each of the first known signal 130a and the second known signal 130b converted into time domain signals in FIG. 1; this is, however, an example, and the radio transmission device 110a is not limited thereto. The radio transmission device 110a may include a GI inserting unit that is one guard interval inserting unit, and this GI inserting unit may insert guard intervals into the first known signal 130a and the second known signal 130b converted into time domain signals.

The transmission antenna 111a is a first transmission antenna that transmits the first known signal 130a into which a guard interval is inserted by the GI inserting unit 114a. The transmission antennas 111b is a second transmission antenna that transmits the second known signal 130b into which a guard interval is inserted by the GI inserting unit 114b. The radio transmission device 110a transmits the first known signal 130a and the second known signal 130b by using two transmission antennas 111a and 111b. Note that, in FIG. 1, only the components of the radio transmission device 110a that are necessary for description of the present embodiment are illustrated, and typical components thereof are not illustrated. The radio transmission device 110a may include known signals, which are not illustrated, other than the first known signal 130a and the second known signal 130b in the transmission so that the first known signal 130a and the second known signal 130b can be detected by the radio reception device 120a.

A configuration of the radio reception device 120a will be described. The radio reception device 120a includes reception antennas 121a and 121b, a signal detecting unit 122, and a timing estimating unit 123.

The reception antenna 121a is a first reception antenna that receives signals including the first known signal 130a and the second known signal 130b transmitted from the radio transmission device 110a, and outputs received signals, which are the signals thus received, to the signal detecting unit 122 and the timing estimating unit 123. The reception antenna 121b is a second reception antenna that receives signals including the first known signal 130a and the second known signal 130b transmitted from the radio transmission device 110a, and outputs received signals, which are the signals thus received, to the signal detecting unit 122 and the timing estimating unit 123. The radio reception device 120a receives the first known signal 130a and the second known signal 130b by using a plurality of reception antennas, which are the two reception antennas 121a and 121b in the example of FIG. 1.

The signal detecting unit 122 detects arrival of desired received signals, which are the first known signal 130a and the second known signal 130b in the present embodiment. The signal detecting unit 122 measures a received power value, and determines whether the first known signal 130a and the second known signal 130b are received or an interference signal is received on the basis of the received power value, for example. The signal detecting unit 122 may determine whether or not the first known signal 130a and the second known signal 130b are received or an interference signal is received by using known signals other than the first known signal 130a and the second known signal 130b. When the first known signal 130a and the second known signal 130b are detected by the signal detecting unit 122, the timing estimating unit 123 estimates frequency deviation of carrier frequency from that at the radio transmission device 110a and estimates temporal synchronization timing such as symbol start timing with the radio transmission device 110a by using the first known signal 130a and the second known signal 130b transmitted from the radio transmission device 110a and included in the received signals received by the reception antennas 121a and 121b. The timing estimating unit 123 estimates the frequency deviation and the temporal synchronization timing by a correlation process using the guard intervals included in the first known signal 130a and the second known signal 130b, for example. The timing estimating unit 123 may estimate the frequency deviation and the temporal synchronization timing by further using pilot signals included in the first known signal 130a and the second known signal 130b in addition to the guard intervals. In the radio reception device 120a, because sufficient accuracy of a demodulation process is not achieved with the timing when the first known signal 130a and the second known signal 130b are detected by the signal detecting unit 122, the timing estimating unit 123 further estimates timing for performing the demodulation process with high accuracy. The functions of the signal detecting unit 122 and the timing estimating unit 123 may be similar to those of the related art. Note that, in FIG. 1, only the components of the radio reception device 120a that are necessary for description of the present embodiment are illustrated, and typical components thereof are not illustrated.

Figure 2:
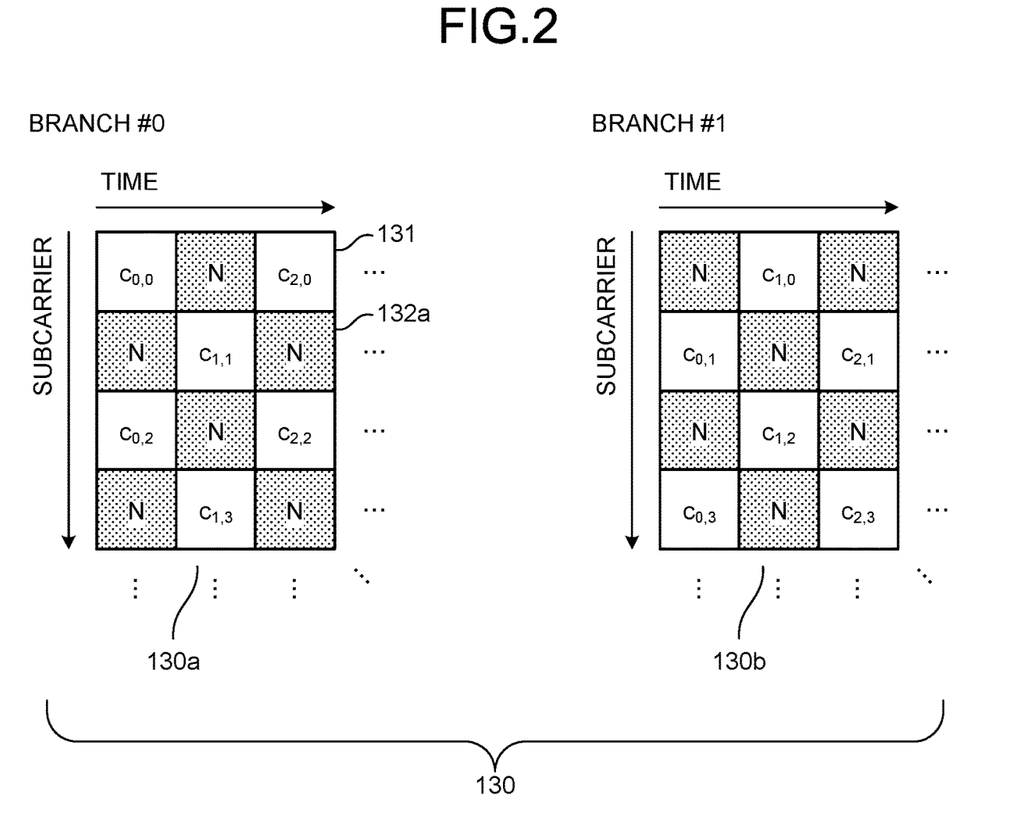
FIG. 2 is a diagram illustrating an example of a first known signal and a second known signal generated by a known signal generating unit of a radio transmission device according to the first embodiment.

FIG. 2 is a diagram illustrating an example of the first known signal 130a and the second known signal 130b generated by the known signal generating unit 112 of the radio transmission device 110a according to the first embodiment. In FIG. 2, the vertical direction represents subcarriers, that is, frequency, and the horizontal direction represents time, that is, symbols. In FIG. 2, one column, such as a column constituted by $c_{0,0}$, N, $c_{0,2}$, N, . . . in the first known signal 130a, corresponds to one symbol. The symbols generated by the known signal generating unit 112 are OFDM symbols as mentioned above. In FIG. 2, a signal represented by $c_{t,n}$ is a first signal 131 that is a known signal mapped on an n-th subcarrier of a t-th symbol and that is not 0. While only $c_{2,0}$ is referred to as the first signal 131 in FIG. 2, any signal represented by the form of $c_{t,n}$ is a first signal 131. In addition, in FIG. 2, a signal represented by N is a first null signal 132a having a signal strength of 0. While only one signal in the first known signal 130a is referred to as the first null signal 132a in FIG. 2, all of the other signals represented by N are first null signals 132a. In the radio transmission device 110a, the first known signal 130a is a signal transmitted via the IDFT unit 113a, the GI inserting unit 114a, and the transmission antenna 111a, and the second known signal 130b is a signal transmitted via the IDFT unit 113b, the GI inserting unit 114b, and the transmission antenna 111b.

As illustrated in FIG. 2, the known signal generating unit 112 maps the first signal 131 and the first null signal 132a in such a manner that the subcarrier on which the first signal 131 is mapped in the first known signal 130a and the subcarrier on which the first signal 131 is mapped in the second known signal 130b do not overlap with each other in the symbols of the one time band. Specifically, the known signal generating unit 112 maps, in the second known signal 130b, the first null signal 132a on the subcarrier corresponding to the subcarrier on which the first signal 131 is mapped in the first known signal 130a in the symbols of the one time band. Similarly, the known signal generating unit 112 maps, in the first known signal 130a, the first null signal 132a on the subcarrier corresponding to the subcarrier on which the first signal 131 is mapped in the second known signal 130b in the symbols of the one time band. The known signal generating unit 112 may generate the aforementioned pilot signals in place of some of the first signals 131. The known signal generating unit 112 includes two branches, and outputs the first known signal 130a from a branch #0 and the second known signal 130b from a branch #1.

As a result, even when the radio reception device 120a receives an interference signal such as a CW with the first known signal 130a and the second known signal 130b transmitted from the radio transmission device 110a, only the known signal transmitted from one transmission antenna in units of symbols is affected by the CW, and the known signal transmitted from the other transmission antenna is not affected by the CW. Thus, in the radio reception device 120a, the signal detecting unit 122 and the timing estimating unit 123 are capable of reducing the influence of the CW by estimating the frequency deviation and the temporal synchronization timing for each of the known signals transmitted from the respective transmission antennas, and using the frequency deviation and the temporal synchronization timing estimated on the basis of the known signal that is not affected by the CW.

Figure 3:
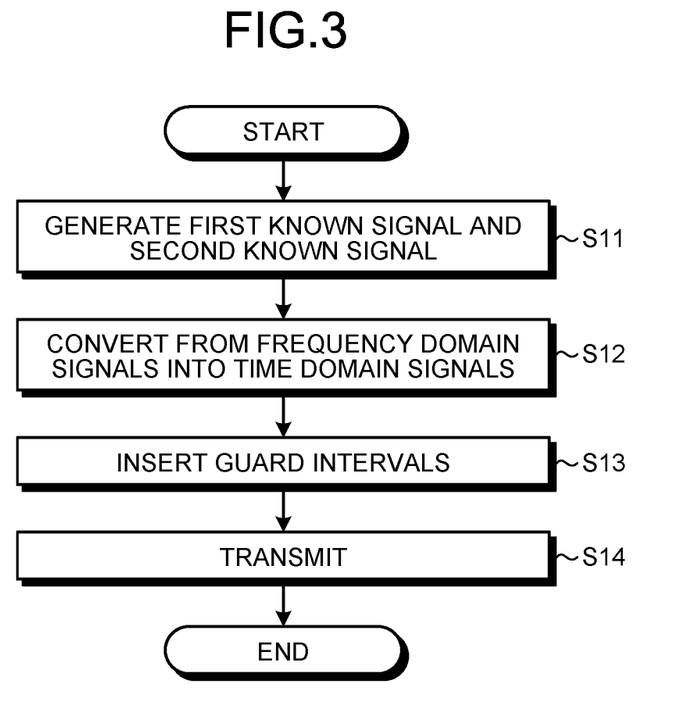
FIG. 3 is a flowchart illustrating a process of transmitting the first known signal and the second known signal by the radio transmission device according to the first embodiment.

The operation of the radio transmission device 110a will be explained with reference to a flowchart. FIG. 3 is a flowchart illustrating a process of transmitting the first known signal 130a and the second known signal 130b by the radio transmission device 110a according to the first embodiment. In the radio transmission device 110a, the known signal generating unit 112 generates the first known signal 130a and the second known signal 130b that are mapped in such a manner that subcarriers for transmitting the first signals 131 that are not 0 do not overlap with each other in the symbols of the one time band (step S11). The IDFT unit 113a converts the first known signal 130a from a frequency domain signal into a time domain signal. In addition, the IDFT unit 113b converts the second known signal 130b from a frequency domain signal into a time domain signal (step S12). The GI inserting unit 114a inserts a guard interval into the first known signal 130a converted into a time domain signal. In addition, the GI inserting unit 114b inserts a guard interval into the second known signal 130b converted into a time domain signal (step S13). The transmission antenna 111a transmits the first known signal 130a into which a guard interval is inserted. In addition, the transmission antenna 111b transmits the second known signal 130b into which a guard interval is inserted (step S14).

Figure 4:
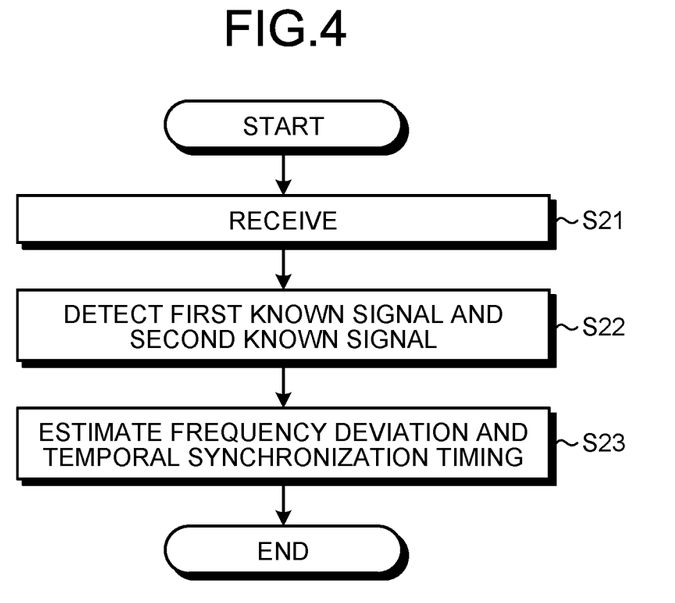
FIG. 4 is a flowchart illustrating a reception process of a radio reception device according to the first embodiment.

The operation of the radio reception device 120a will be explained with reference to a flowchart. FIG. 4 is a flowchart illustrating a reception process of the radio reception device 120a according to the first embodiment. In the radio reception device 120a, the reception antennas 121a and 121b receive signals including the first known signal 130a and the second known signal 130b transmitted from the radio transmission device 110a (step S21). The signal detecting unit 122 detects the first known signal 130a and the second known signal 130b transmitted from the radio transmission device 110a from among received signals, which are the signals received by the reception antennas 121a and 121b (step S22). When the first known signal 130a and the second known signal 130b are detected by the signal detecting unit 122, the timing estimating unit 123 estimates the frequency deviation and the temporal synchronization timing by using the first known signal 130a and the second known signal 130b included in the received signals (step S23).

A hardware configuration of the radio transmission device 110a and the radio reception device 120a will now be described. The transmission antennas 111a and 111b of the radio transmission device 110a and the reception antennas 121a and 121b of the radio reception device 120a are antenna elements. In the radio transmission device 110a, the known signal generating unit 112, the IDFT units 113a and 113b, and the GI inserting units 114a and 114b are implemented by processing circuitry. In the radio reception device 120a, the signal detecting unit 122 and the timing estimating unit 123 are implemented by processing circuitry. The processing circuitry may be dedicated hardware, or may be a control circuit including a memory and a processor for executing programs stored in the memory. The processor may be a central processing unit (CPU), a central processor, a processing device, a computing device, a microprocessor, a microcomputer, a digital signal processor (DSP), or the like. The memory may be a nonvolatile or volatile semiconductor memory such as a random access memory (RAM), a read only memory (ROM), a flash memory, an erasable programmable read only memory (EPROM), or an electrically erasable programmable read only memory (EEPROM: registered trademark), a magnetic disk, a flexible disk, an optical disk, a compact disc, a mini disc, a digital versatile disc (DVD), or the like, for example.

Figure 5:
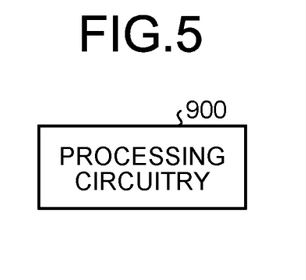
FIG. 5 is a diagram illustrating an example of a case where processing circuitry included in the radio transmission device or the radio reception device according to the first embodiment is constituted by dedicated hardware.

FIG. 5 is a diagram illustrating an example of a case where the processing circuitry included in the radio transmission device 110a or the radio reception device 120a according to the first embodiment is constituted by dedicated hardware. In a case where the processing circuitry is implemented by dedicated hardware, the processing circuitry is processing circuitry 900 illustrated in FIG. 5. The processing circuitry 900 is a single circuit, a composite circuit, a programmed processor, a parallel-programmed processor, an application specific integrated circuit (ASIC), a field programmable gate array (FPGA), or a combination thereof, for example.

Figure 6:
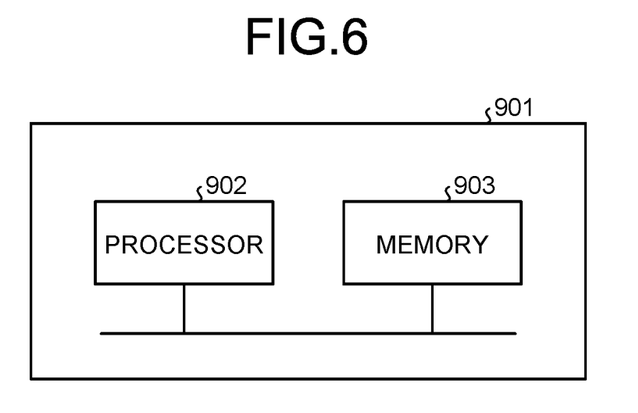
FIG. 6 is a diagram illustrating an example of a case where processing circuitry included in the radio transmission device or the radio reception device according to the first embodiment is constituted by a control circuit including a processor.

FIG. 6 is a diagram illustrating an example of a case where the processing circuitry included in the radio transmission device 110a or the radio reception device 120a according to the first embodiment is constituted by a control circuit including a processor. In a case where the processing circuitry is constituted by a control circuit including a processor, the control circuit is a control circuit 901 illustrated in FIG. 6, for example. The control circuit 901 includes a processor 902 and a memory 903. The processing circuitry included in the radio transmission device 110a or the radio reception device 120a is implemented by the processor 902 by reading and executing programs, associated with the respective components, stored in the memory 903. In addition, the memory 903 is also used as a temporary memory in processes performed by the processor 902.

As described above, according to the present embodiment, in an environment in which a plurality of radio communication systems have a frequency band in common, the radio transmission device 110a transmits, from the two transmission antennas 111a and 111b, the first known signal 130a and the second known signal 130b that are mapped in such a manner that subcarriers for transmitting the first signals 131 that are not 0 do not overlap with each other in the symbols of the one time band. The radio reception device 120a estimates the frequency deviation and the temporal synchronization timing for each of the known signals transmitted from the respective transmission antennas 111a and 111b, and uses the frequency deviation and the temporal synchronization timing estimated on the basis of the known signal that is not affected by an interference signal such as a CW or short time interference. As a result, even in an environment in which interference signals unrelated to the radio communication system 100a are present, the radio reception device 120a is capable of removing the influence of the interference signals and estimating the frequency deviation and the temporal synchronization timing with high accuracy.

Second Embodiment

In a second embodiment, the radio transmission device inserts second null signals into positions of corresponding symbols and subcarriers in the first known signal 130a and the second known signal 130b so that interference signals can be suppressed by the radio reception device. The differences from the first embodiment will be described.

Figure 7:
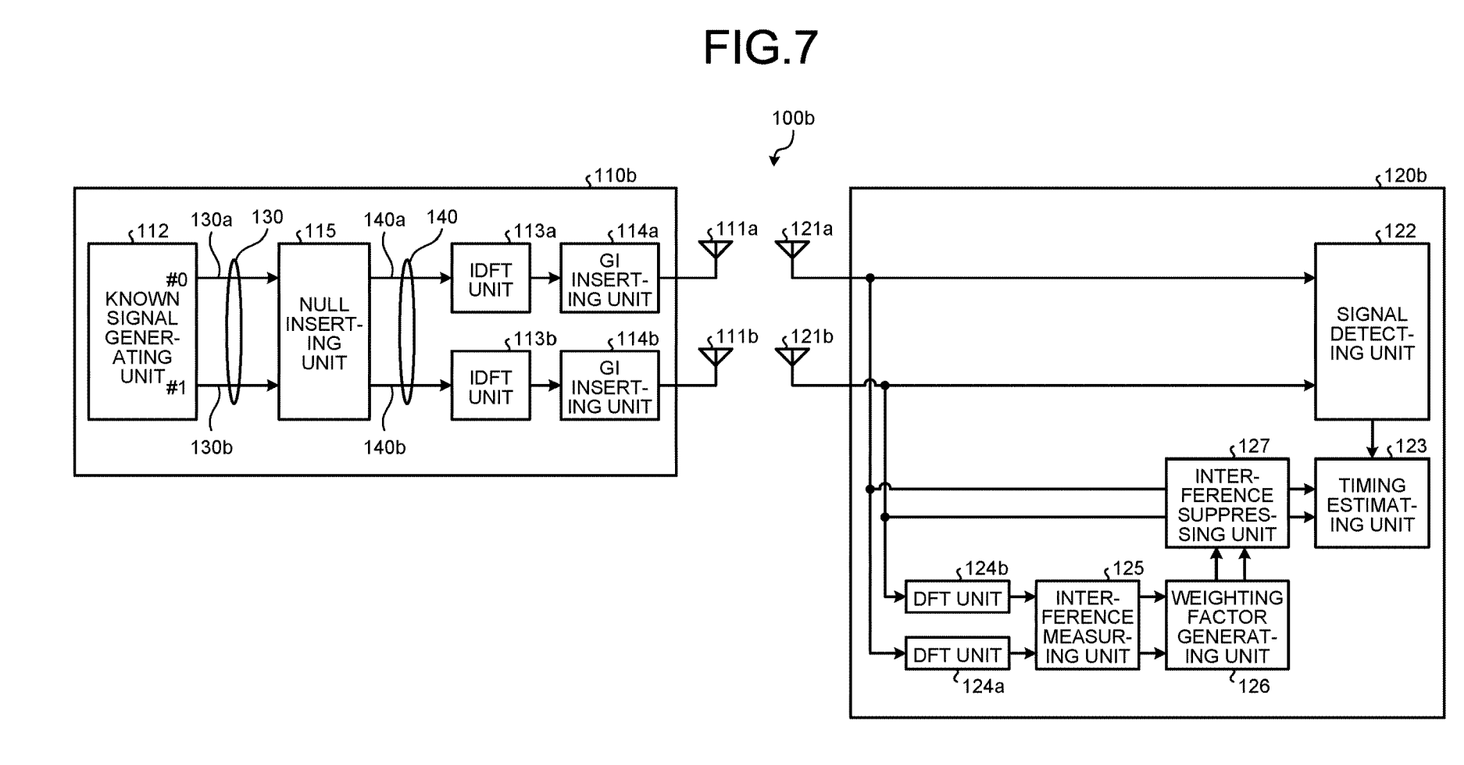
FIG. 7 is a diagram illustrating an example of a configuration of a radio communication system according to a second embodiment.

FIG. 7 is a diagram illustrating an example of a configuration of a radio communication system 100b according to the second embodiment. The radio communication system 100b includes a radio transmission device 110b and a radio reception device 120b. The radio communication system 100b is assumed to be in an environment in which the radio communication system 100b has a frequency band in common with other radio communication systems, which are not illustrated. In the radio communication system 100b, the radio reception device 120b may also receive interference signals such as signals transmitted from radio devices included in other radio communication systems, CWs, and short-time interference, in addition to desired signals transmitted from the radio transmission device 110b.

A configuration of the radio transmission device 110b will be described. The radio transmission device 110b includes transmission antennas 111a and 111b, a known signal generating unit 112, IDFT units 113a and 113b, GI inserting units 114a and 114b, and a null inserting unit 115.

The null inserting unit 115 inserts second null signals into positions of corresponding symbols and subcarriers in the first known signal 130a and the second known signal 130b output from the known signal generating unit 112.

A configuration of the radio reception device 120b will be described. The radio reception device 120b includes reception antennas 121a and 121b, a signal detecting unit 122, a timing estimating unit 123, discrete Fourier transform (DFT) units 124a and 124b, an interference measuring unit 125, a weighting factor generating unit 126, and an interference suppressing unit 127.

The DFT unit 124a converts received signals received by the reception antenna 121a from time domain signals into frequency domain signals by performing discrete Fourier transform on the received signals. The DFT unit 124b converts received signals received by the reception antenna 121b from time domain signals into frequency domain signals by performing discrete Fourier transform on the received signals.

The interference measuring unit 125 measures the amount of interference of the interference signals on the subcarriers into which the second null signals are inserted by using the second null signals inserted into positions of corresponding symbols and subcarriers in the first known signal 130a and the second known signal 130b included in the received signals received by the reception antennas 121a and 121b and converted from time domain signals into frequency domain signals by the DFT units 124a and 124b. The interference signals are signals included in the received signals received by the reception antennas 121a and 121b.

The weighting factor generating unit 126 generates a weighting factor for suppressing the amount of interference of the interference signals on the basis of the result of measurement of the interference measuring unit 125, that is, the amount of interference of the interference signals.

The interference suppressing unit 127 performs interference suppression of removing the influence of interference of the interference signals on the received signals received by the reception antennas 121a and 121b by using the weighting factor generated by the weighting factor generating unit 126.

The timing estimating unit 123 estimates the frequency deviation from and the temporal synchronization timing with those at the radio transmission device 110b by using the first known signal 130a and the second known signal 130b included in the received signals resulting from the interference suppression performed by the interference suppressing unit 127.

Figure 8:
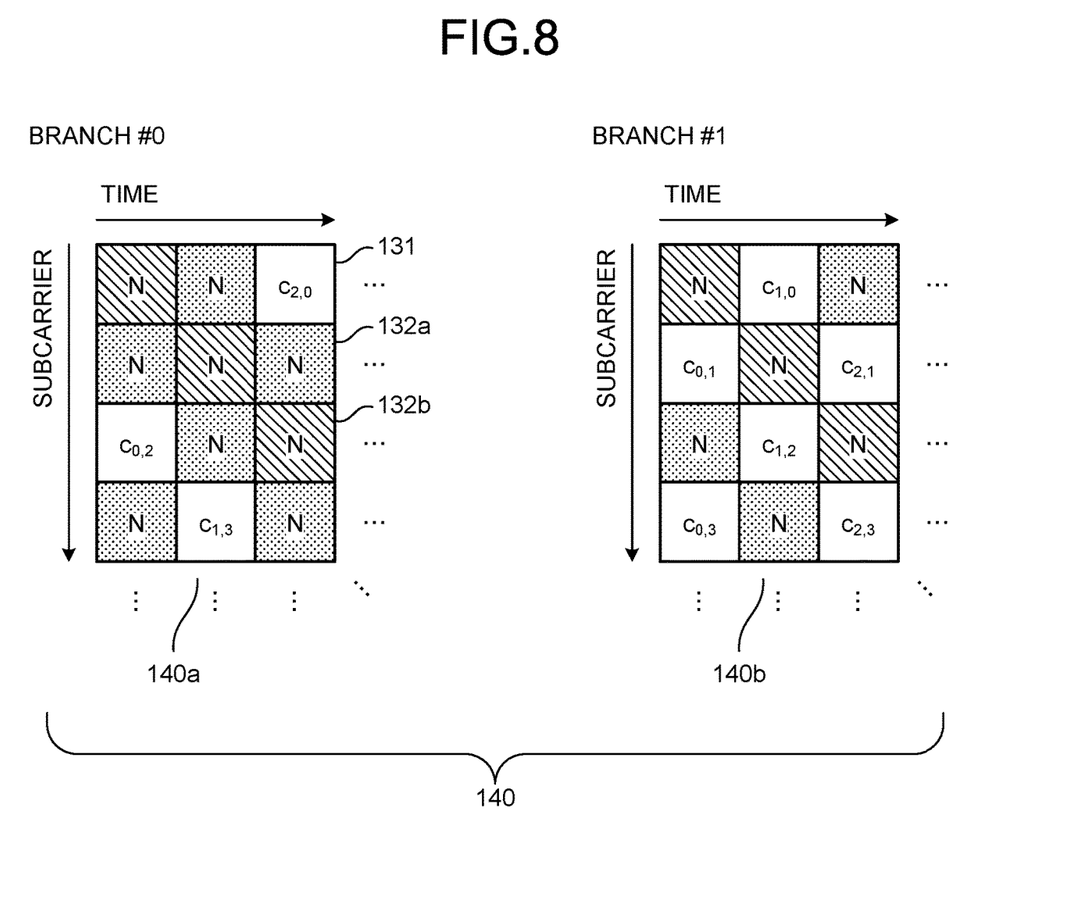
FIG. 8 is a diagram illustrating an example of insertion of second null signals into a first known signal and a second known signal by a null inserting unit of a radio transmission device according to the second embodiment.

FIG. 8 is a diagram illustrating an example of insertion of the second null signals into the first known signal 130a and the second known signal 130b by the null inserting unit 115 of the radio transmission device 110b according to the second embodiment. The first known signal 130a into which the second null signals 132b are inserted by the null inserting unit 115 will be referred to as a first null inserting unit output signal 140a, and the second known signal 130b into which the second null signals 132b are inserted by the null inserting unit 115 will be referred to as a second null inserting unit output signal 140b. The first null inserting unit output signal 140a and the second null inserting unit output signal 140b will be collectively referred to as null inserting unit output signals 140. The first known signal 130a and the second known signal 130b generated by the known signal generating unit 112 are assumed to be similar to those in the first embodiment. As illustrated in FIG. 8, the null inserting unit 115 inserts second null signals 132b into positions of corresponding symbols and subcarriers in the first known signal 130a and the second known signal 130b. While only one signal in the first known signal 130a is referred to as the second null signal 132b in FIG. 8, the signals that are hatched in the same manner as the second null signal 132b are also second null signals 132b having a signal strength of 0.

Figure 9:
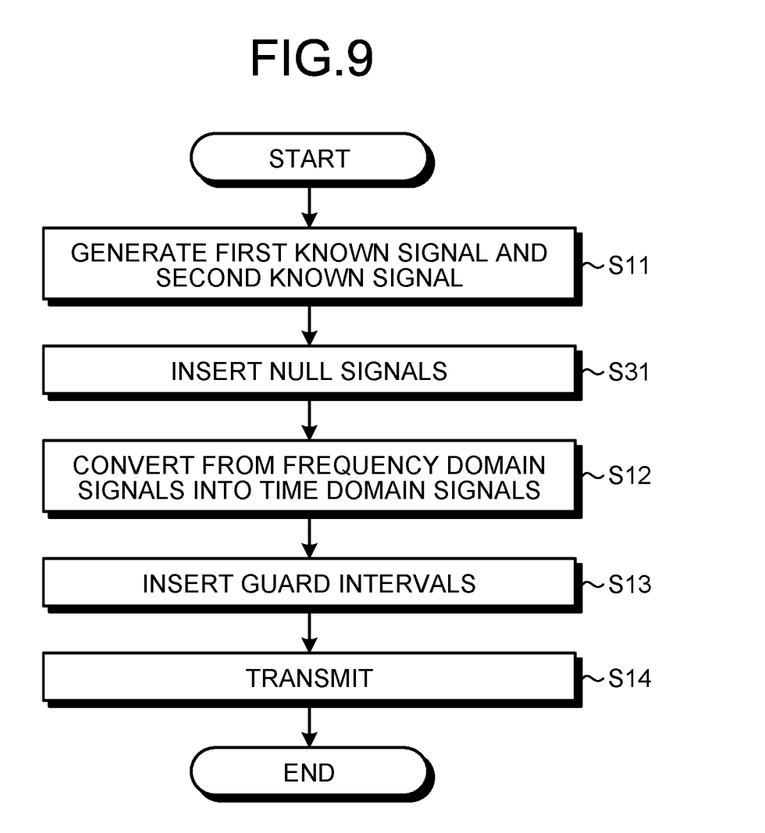
FIG. 9 is a flowchart illustrating a process of inserting second null signals into a first known signal and a second known signal and transmitting the first known signal and the second known signal by the radio transmission device according to the second embodiment.

The operation of the radio transmission device 110b will be explained with reference to a flowchart. FIG. 9 is a flowchart illustrating a process of inserting the second null signals 132b into the first known signal 130a and the second known signal 130b and transmitting the first known signal 130a and the second known signal 130b by the radio transmission device 110b according to the second embodiment. In the flowchart illustrated in FIG. 9, the operation in step S11 is similar to that in the first embodiment illustrated in FIG. 3. The null inserting unit 115 inserts the second null signals 132b into positions of corresponding symbols and subcarriers in the first known signal 130a and the second known signal 130b output from the known signal generating unit 112 (step S31). The IDFT unit 113a converts the first known signal 130a into which the second null signals 132b are inserted from a frequency domain signal into a time domain signal. In addition, the IDFT unit 113b converts the second known signal 130b into which the second null signals 132b are inserted from a frequency domain signal into a time domain signal (step S12). The subsequent operation is similar to that in the first embodiment illustrated in FIG. 3.

Figure 10:
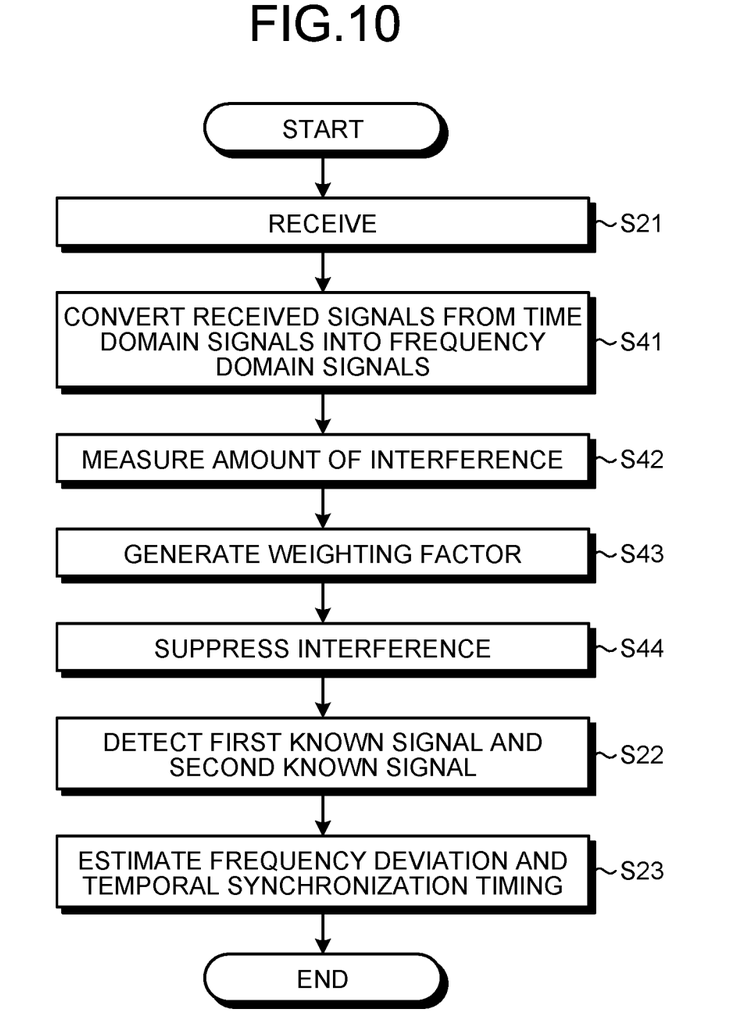
FIG. 10 is a flowchart illustrating a reception process of a radio reception device according to the second embodiment.

The radio reception device 120b performs interference suppression on the received signals by using the second null signals 132b inserted in the first known signal 130a and the second known signal 130b. As a result, the radio reception device 120b is capable of performing interference suppression in real time in response to short-time interference or the like, which improves interference immunity performance. The operation of the radio reception device 120b will be explained with reference to a flowchart. FIG. 10 is a flowchart illustrating a reception process of the radio reception device 120b according to the second embodiment. In the flowchart illustrated in FIG. 10, the operation in step S21 is similar to that in the first embodiment illustrated in FIG. 4. In the radio reception device 120b, the DFT units 124a and 124b convert received signals from time domain signals into frequency domain signals (step S41). The interference measuring unit 125 measures the amount of interference of interference signals by using the second null signals 132b in the first known signal 130a and the second known signal 130b included in the received signals converted into frequency domain signals (step S42). The weighting factor generating unit 126 generates a weighting factor for suppressing the amount of interference by using the result of measurement of the interference measuring unit 125 (step S43). The interference suppressing unit 127 performs interference suppression on the received signals by using the weighting factor generated by the weighting factor generating unit 126 (step S44). The signal detecting unit 122 detects the first known signal 130a and the second known signal 130b transmitted from the radio transmission device 110b from among received signals, which are the signals received by the reception antennas 121a and 121b (step S22). When the first known signal 130a and the second known signal 130b are detected by the signal detecting unit 122, the timing estimating unit 123 estimates the frequency deviation and the temporal synchronization timing by using the first known signal 130a and the second known signal 130b included in the received signals resulting from the interference suppression performed by the interference suppressing unit 127 (step S23).

Regarding the hardware configurations of the radio transmission device 110b and the radio reception device 120b, the null inserting unit 115 of the radio transmission device 110b, and the DFT units 124a and 124b, the interference measuring unit 125, the weighting factor generating unit 126, and the interference suppressing unit 127 of the radio reception device 120b are implemented by processing circuitry. In a manner similar to the first embodiment, the processing circuitry may be dedicated hardware, or may be a control circuit including a memory and a processor for executing programs stored in the memory.

As described above, according to the present embodiment, the radio transmission device 110b inserts the second null signals 132b into positions of corresponding symbols and subcarriers in the first known signal 130a and the second known signal 130b. The radio reception device 120b performs interference suppression by using the second null signals 132b. This enables the radio reception device 120b to estimate the frequency deviation and the temporal synchronization timing with higher accuracy than the radio reception device 120a of the first embodiment.

Third Embodiment

In a third embodiment, the known signal generating unit 112 codes the first signals 131 and the first null signals 132a before mapping. The differences from the first embodiment will be described.

Figure 11:
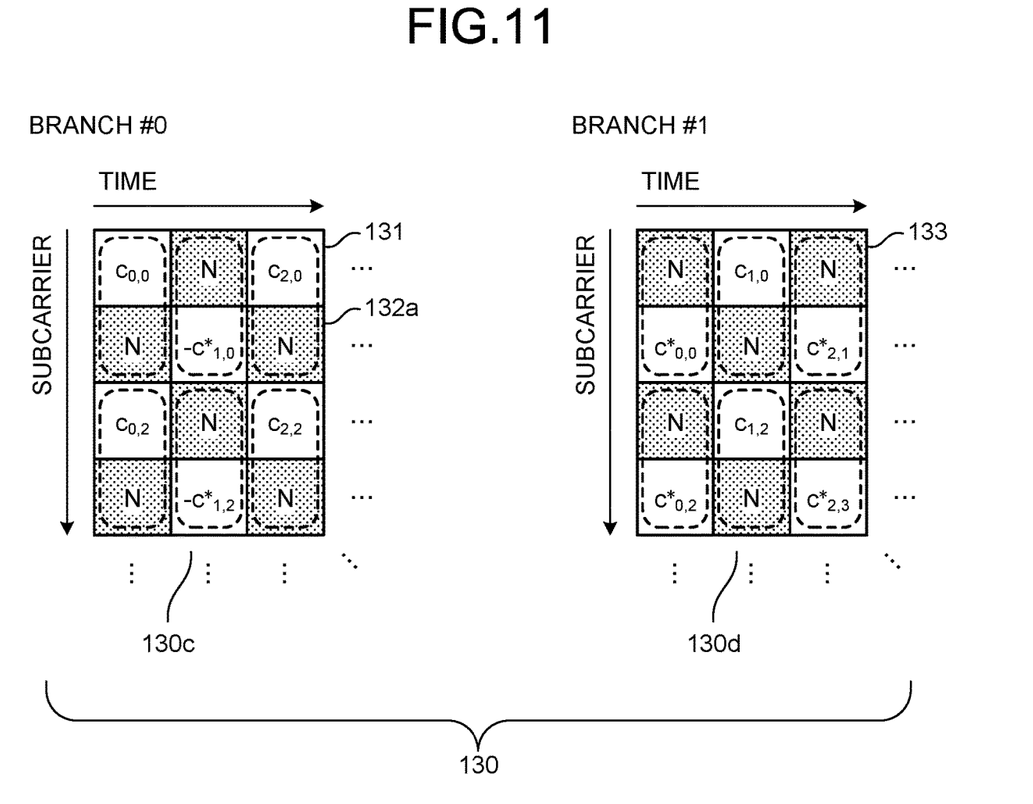
FIG. 11 is a diagram illustrating an example of a first known signal and a second known signal generated by a known signal generating unit of a radio transmission device according to a third embodiment.

A radio communication system 100a according to the third embodiment has a configuration similar to that of the radio communication system 100a of the first embodiment. In the third embodiment, the method of mapping performed by the known signal generating unit 112 of the radio transmission device 110a is different from that in the first embodiment. FIG. 11 is a diagram illustrating an example of a first known signal 130c and a second known signal 130d generated by the known signal generating unit 112 of the radio transmission device 110a according to the third embodiment. Unlike the first embodiment, the known signal generating unit 112 performs space-frequency block coding (SFBC) on the first signals 131, which are known signal that are not 0, and the first null signals 132a between adjacent subcarriers and between branches, that is, between the first known signal 130c and the second known signal 130d, before mapping. In FIG. 11, the SFBC is performed between signals enclosed by frames 133 of broken lines. As a result, the known signal generating unit 112 is capable of arranging the first signals 131 in such a manner that the subcarriers for transmission never overlap between the branches, that is, between the first known signal 130c and the second known signal 130d transmitted from the respective transmission antennas 111a and 111b.

While an example in which the known signal generating unit 112 performs the SFBC is explained in the present embodiment, the known signal generating unit 112 is not limited thereto. The known signal generating unit 112 is capable of producing similar effects by performing block coding other than the SFBC on the first signals 131 and the first null signals 132a. In addition, in a case where differential space-time block codes (DSTBCs) are used as modulated signals, the known signal generating unit 112 is capable of using, as start symbols of the DSTBCs, the last symbols of the first known signal 130c and the second known signal 130d using block codes. The known signal generating unit 112 is capable of performing block coding and mapping by using two of the time direction, the frequency direction, and between the first known signal 130c and the second known signal 130d depending on the combination of the first signals 131 and the first null signals 132a.

As described above, according to the present embodiment, the radio transmission device 110a performs coding such as the SFBC on the first signals 131 and the first null signals 132a before mapping. As a result, the radio transmission device 110a is capable of arranging the first signals 131 in such a manner that the subcarriers for transmission do not overlap between the first known signal 130c and the second known signal 130d in the symbols of the one time band.

Fourth Embodiment

In a fourth embodiment, the known signal generating unit 112 performs coding on the first signals 131 and the first null signals 132a before mapping. The differences from the second embodiment will be described.

A radio communication system 100b according to the fourth embodiment has a configuration similar to that of the radio communication system 100b of the second embodiment. In the fourth embodiment, the method of mapping performed by the known signal generating unit 112 of the radio transmission device 110b is different from that in the second embodiment. The method of mapping performed by the known signal generating unit 112 is similar to that in the third embodiment illustrated in FIG. 11. In the fourth embodiment, the null inserting unit 115 inserts the second null signals 132b into the first known signal 130c and the second known signal 130d illustrated in FIG. 11. The radio transmission device 110b is capable of inserting the second null signals 132b necessary for interference suppression at the radio reception device 120b while performing coding.

While an example in which the known signal generating unit 112 performs the SFBC is explained in the present embodiment, the known signal generating unit 112 is not limited thereto. The known signal generating unit 112 is capable of producing similar effects by performing block coding other than the SFBC on the first signals 131 and the first null signals 132a. In addition, in a case where the known signal generating unit 112 uses the DSTBCs as modulated signals, the null inserting unit 115 does not insert the second null signals 132b only in the last symbols, and the radio transmission device 110b is thus capable of using, as start symbols of the DSTBCs, the last symbols of the first known signal 130c and the second known signal 130d using the block codes. The known signal generating unit 112 is capable of performing block coding and mapping by using two of the time direction, the frequency direction, and between the first known signal 130c and the second known signal 130d depending on the combination of the first signals 131 and the first null signals 132a.

As described above, according to the present embodiment, the radio transmission device 110b performs coding such as the SFBC on the first signals 131 and the first null signals 132a before mapping. As a result, the radio transmission device 110b is capable of arranging the first signals 131 in such a manner that the subcarriers for transmission do not overlap between the first known signal 130c and the second known signal 130d in the symbols of the one time band.

Figure 12:
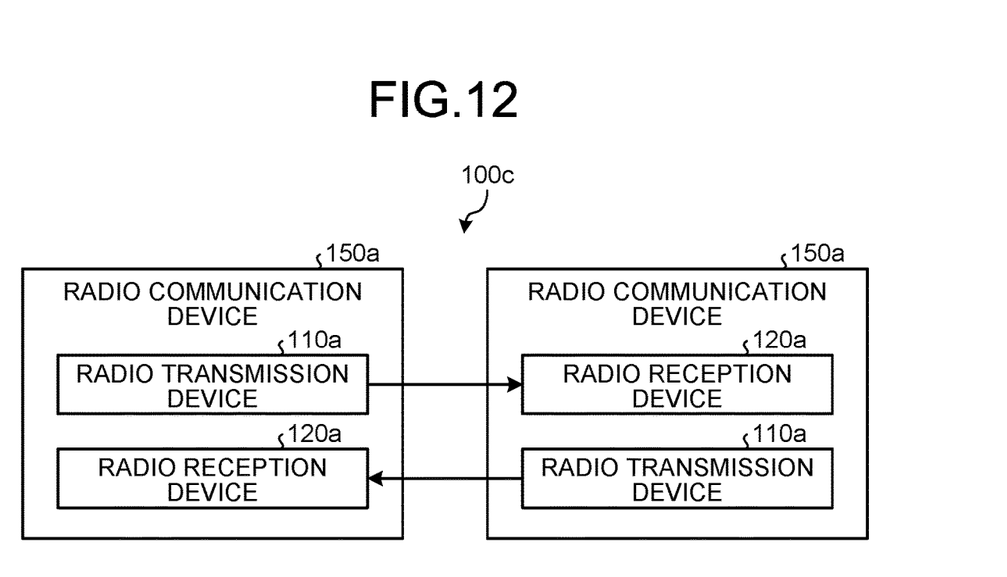
FIG. 12 is a diagram illustrating a first example of a radio communication system that performs radio communication bi-directionally.
Figure 13:
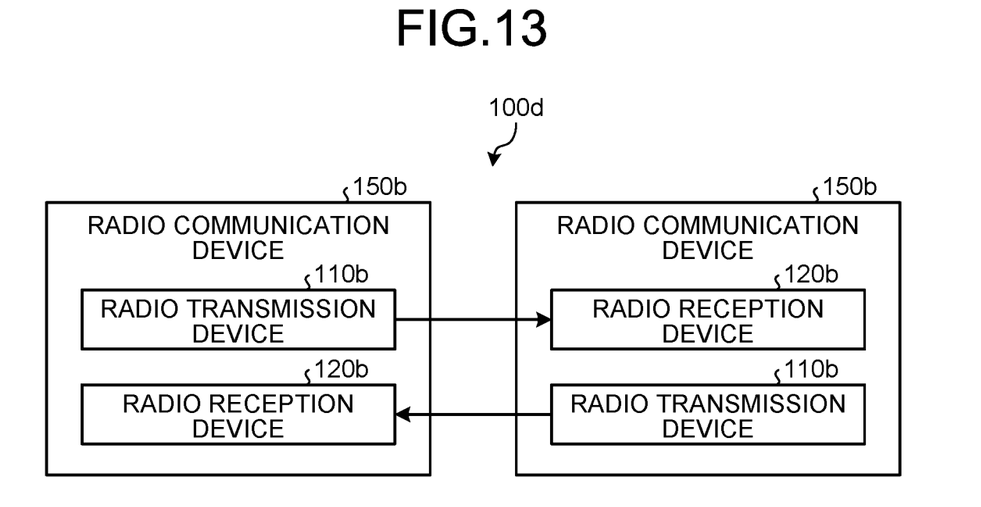
FIG. 13 is a diagram illustrating a second example of a radio communication system that performs radio communication bi-directionally.

While a case where signals are transmitted from the radio transmission device 110a to the radio reception device 120a is described in the first and third embodiments, and a case where signals are transmitted from the radio transmission device 110b to the radio reception device 120b is described in the second and fourth embodiments, radio communication may be performed bi-directionally. Specifically, one radio communication device includes the radio transmission device 110a and the radio reception device 120a or the radio transmission device 110b and the radio reception device 120b, and performs radio communication bi-directionally with another radio communication device. FIG. 12 is a diagram illustrating a first example of a radio communication system 100c that performs radio communication bi-directionally. The radio communication system 100c includes two radio communication devices 150a. The radio communication devices 150a each include the radio transmission device 110a and the radio reception device 120a. In the radio communication system 100c, signals transmitted from the radio transmission device 110a of one radio communication device 150a are received by the radio reception device 120a of the other radio communication device 150a, and signals transmitted from the radio transmission device 110a of the other radio communication device 150a are received by the radio reception device 120a of the one radio communication device 150a. The configurations and the operations of the radio transmission device 110a and the radio reception device 120a are as described above. Note that the radio communication system 100c may include three or more radio communication devices 150a. FIG. 13 is a diagram illustrating a second example of a radio communication system 100d that performs radio communication bi-directionally. The radio communication system 100d includes two radio communication devices 150b. The radio communication devices 150b each include the radio transmission device 110b and the radio reception device 120b. In the radio communication system 100d, signals transmitted from the radio transmission device 110b of one radio communication device 150b are received by the radio reception device 120b of the other radio communication device 150b, and signals transmitted from the radio transmission device 110b of the other radio communication device 150b are received by the radio reception device 120b of the one radio communication device 150b. The configurations and the operations of the radio transmission device 110b and the radio reception device 120b are as described above. Note that the radio communication system 100d may include three or more radio communication devices 150b.

The radio transmission device according to the disclosure produces an effect of enabling transmission of signals that enable removal of the influence of interference signals at a radio reception device in an environment in which a plurality of radio communication systems have a frequency band in common.

The configurations presented in the embodiments above are examples, and can be combined with other known technologies or can be partly omitted or modified without departing from the scope.

What is claimed is:

1. A radio reception device comprising: a plurality of reception antennas; an interference measurer to measure an amount of interference of an interference signal by using a second null signal inserted into positions of corresponding symbols and subcarriers in a first known signal and a second known signal transmitted from the a radio transmission device and included in a received signal received by the reception antennas; a weighting factor generator to generate a weighting factor for suppressing the amount of interference on a basis of a result of measurement of the interference measurer; an interference suppressor to perform interference suppression on the received signal by using the weighting factor generated by the weighting factor generator; and a timing estimator to estimate frequency deviation from and temporal synchronization timing with the radio transmission device by using the first known signal and the second known signal included in the received signal resulting from the interference suppression by the interference suppressor,
   wherein the radio transmission device includes a known signal generator to generate the first known signal and the second known signal in which a first signal and a first null signal are mapped continuously and alternately in time direction and frequency direction in such a manner that subcarriers for transmitting the first signal do not overlap with each other in symbols of one time band, the first signal being a known signal and not being 0;
   an inverse discrete Fourier transformer to convert each of the first known signal and the second known signal from a frequency domain signal into a time domain signal; a guard interval inserter to insert a guard interval into each of the first known signal and the second known signal converted into time domain signals;
   a null inserter to insert the second null signal into positions of corresponding symbols and subcarriers in the first known signal and the second known signal output from the known signal generator,
   a first transmission antenna to transmit the first known signal in which the guard interval is inserted; and
   a second transmission antenna to transmit the second known signal in which the guard interval is inserted, wherein the known signal generator performs block coding by using two of the time direction, the frequency direction, and between the first known signal and the second known signal depending on combination of the first signal and the first null signal, before mapping, and wherein the inverse discrete Fourier transformer converts each of the first known signal and the second known signal into which the second null signal is inserted by the null inserter from the frequency domain signal into the time domain signal.

2. A radio communication device comprising: the radio transmission device including a known signal generator to generate a first known signal and a second known signal in which a first signal and a first null signal are mapped continuously and alternately in time direction and frequency direction in such a manner that subcarriers for transmitting the first signal do not overlap with each other in symbols of one time band, the first signal being a known signal and not being 0; an inverse discrete Fourier transformer to convert each of the first known signal and the second known signal from a frequency domain signal into a time domain signal; a guard interval inserter to insert a guard interval into each of the first known signal and the second known signal converted into time domain signals, a null inserter to insert a second null signal into positions of corresponding symbols and subcarriers in the first known signal and the second known signal output from the known signal generator; a first transmission antenna to transmit the first known signal in which the guard interval is inserted; and a second transmission antenna to transmit the second known signal in which the guard interval is inserted, wherein the known signal generator performs block coding by using two of the time direction, the frequency direction, and between the first known signal and the second known signal depending on combination of the first signal and the first null signal, before mapping, and the inverse discrete Fourier transformer converts each of the first known signal and the second known signal into which the second null signal is inserted by the null inserter from a frequency domain signal into a time domain signal; and
   a radio reception device, wherein the radio reception device includes: a plurality of reception antennas;
   an interference measurer to measure an amount of interference of an interference signal by using the second null signal inserted into positions of corresponding symbols and subcarriers in the first known signal and the second known signal transmitted from the radio transmission device and included in a received signal received by the reception antennas;
   a weighting factor generator to generate a weighting factor for suppressing the amount of interference on a basis of a result of measurement of the interference measurer;
   an interference suppressor to perform interference suppression on the received signal by using the weighting factor generated by the weighting factor generator; and
   a timing estimator to estimate frequency deviation from and temporal synchronization timing with the radio transmission device by using the first known signal and the second known signal included in the received signal resulting from the interference suppression by the interference suppressor.

3. A radio communication system comprising: a radio transmission device including
   a known signal generator to generate a first known signal and a second known signal in which a first signal and a first null signal are mapped continuously and alternately in time direction and frequency direction in such a manner that subcarriers for transmitting the first signal do not overlap with each other in symbols of one time band, the first signal being a known signal and not being 0;

an inverse discrete Fourier transformer to convert each of the first known signal and the second known signal from a frequency domain signal into a time domain signal;

a guard interval inserter to insert a guard interval into each of the first known signal and the second known signal converted into time domain signals;

a null inserter to insert a second null signal into positions of corresponding symbols and subcarriers in the first known signal and the second known signal output from the known signal generator;

a first transmission antenna to transmit the first known signal in which the guard interval is inserted; and a second transmission antenna to transmit the second known signal in which the guard interval is inserted, wherein the known signal generator performs block coding by using two of the time direction, the frequency direction, and between the first known signal and the second known signal depending on combination of the first signal and the first null signal, before mapping, and the inverse discrete Fourier transformer converts each of the first known signal and the second known signal into which the second null signal is inserted by the null inserter from a frequency domain signal into a time domain signal; and a radio reception device, wherein the radio reception device includes; a plurality of reception antennas;

an interference measurer to measure an amount of interference of an interference signal by using the second null signal inserted into positions of corresponding symbols and subcarriers in the first known signal and the second known signal transmitted from the radio transmission device and included in a received signal received by the reception antennas;

a weighting factor generator to generate a weighting factor for suppressing the amount of interference on a basis of a result of measurement of the interference measurer;

an interference suppressor to perform interference suppression on the received signal by using the weighting factor generated by the weighting factor generator; and a timing estimator to estimate frequency deviation from and temporal synchronization timing with the radio transmission device by using the first known signal and the second known signal included in the received signal resulting from the interference suppression by the interference suppressor.

* * * * *